US007826412B2

(12) United States Patent
Binding et al.

(10) Patent No.: US 7,826,412 B2
(45) Date of Patent: Nov. 2, 2010

(54) SYSTEMS, METHODS AND COMPUTER PRODUCTS FOR PROVIDING A GRADIENT DRIVEN MESH-NETWORK ESTABLISHMENT

(75) Inventors: Carl Binding, Reuschlikon (CH); Francois B. Dolivo, Waedenswil (CH); Reto J. Hermann, Buttikon (CH); Dirk Husemann, Adliswil (CH); Michael E. Nidd, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 11/848,391

(22) Filed: Aug. 31, 2007

(65) Prior Publication Data

US 2009/0059843 A1 Mar. 5, 2009

(51) Int. Cl.
*H04W 4/00* (2009.01)
*H04Q 7/24* (2006.01)
*G06F 11/00* (2006.01)

(52) U.S. Cl. ....................... 370/328; 370/238; 370/468; 455/452.1

(58) Field of Classification Search ...... 370/230–238.1, 370/252, 254, 389–392, 401, 465–468; 455/435.2, 455/452.1, 550.1
See application file for complete search history.

(56) References Cited

U.S. PATENT DOCUMENTS 7,590,068 B2 * 9/2009 Larsen et al. ............... 370/238
2008/0075029 A1 * 3/2008 Song .......................... 370/311

OTHER PUBLICATIONS

Analysis of Gradient-Based Routing Protocols in Sensor Networsk, [online]; [retrieved on Jul. 7, 2010]; retrieved from the Internet http://www-rcf.usc.edu/~kpsounis/Papers/gradient.pdf.
Gradient-Based Routing in Sensor Networks, [online]; [retrieved on Jul. 7, 2010]; retrieved from the Internet http://citeseer.ist.psu.edu/cache/papers/cs/32228/http:zSzzSzwww.sigmobile.orgzSzmobicomzSz2003zSzposterszSz4-Faruque.pdf/faruque03gradientbased.pdf.
Rugged: RoUting on finGerprint Gradients in sEnsor Networks, [online]; [retrieved on Jul. 7, 2010]; retrieved from the Internet http://www.cise.ufl.edu/~helmy/papers/Rugged-ICPS-04-published.pdf.

(Continued)

*Primary Examiner*—Afsar M. Qureshi
(74) *Attorney, Agent, or Firm*—Cantor Colburn LLP; Stephen Kaufman

(57) ABSTRACT

Systems, methods and computer products for establishing a mesh-network consisting of wireless personal area network (WPAN) having a large number of nodes. Exemplary embodiments include a gradient-driven mesh-network establishment method, including switching on a plurality of nodes in a vicinity of the wireless personal area network, detecting an acknowledgment signal via a wireless personal area network signal, querying for at least one or a resource and a physical quantity, selecting a subset of the plurality of nodes and instructing the subset of the plurality of nodes to send out a low power radio transceiver DISCOVER squirt signal to a neighborhood associated with the subset of the plurality of nodes, wherein nodes exclusive of the subset of the plurality of nodes turn off in response to an expiration of a time-out period.

6 Claims, 3 Drawing Sheets

OTHER PUBLICATIONS

Gradient-Based Routing in Sensor Networks, [online]; [retrieved on Jul. 7, 2010]; retrieved from the Internet http://nile.cise.ufl.edu/wb/media/publication/2003/jabed_poster_gradient-based%20routing%20in%20sensor%20networks.pdf.
Service Discovery in Mobile Ad Hoc Networks: A Field Theoretic Approach, [online]; [retrieved on Jul. 7, 2010]; retrieved from the Internet http://www.lenders.ch/publications/conferences/wowmom05.pdf.
Solar-aware Routing in Wireless Sensor Networks, [online]; [retrieved on Jul. 7, 2010]; retrieved from the Internet http://citeseer.ist.psu.edu/cache/papers/cs2/634/http:zSzzSzwww.sics.sezSz~thiemozSzPWC2003.pdf/voigt03solaraware.pdf.

* cited by examiner

SYSTEMS, METHODS AND COMPUTER PRODUCTS FOR PROVIDING A GRADIENT DRIVEN MESH-NETWORK ESTABLISHMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to mesh networks, and particularly to systems, methods and computer products for establishing a mesh-network consisting of a wireless personal area network (WPAN) having a large number of nodes.

2. Description of Background

Integrated Wireless personal area networks (WPANs) convey information over relatively short distances using low-power radio transceivers based e.g. on the IEEE 802.15.4 standard. These radios are becoming cheap enough and sufficiently power efficient to be included in all kind of devices: cellular phones, PDAs, laptops, sensor devices, embedded devices, etc. In many situations it is desirable for one device to access a service provided by another device, either because the device itself does not support this service or because the device is in a state that the service is not available to itself. To reach the device offering an operational desired service the original device might have to initiate and traverse a wireless mesh-network.

Wireless mesh-networks are established using a large number of wireless devices called "nodes" that can relay messages and have messages relayed. The main features of such a mesh-network are that (1) the network can cover a large area that is typically much larger than the reach of the base technology; (2) the mesh-network is self-healing in the sense that it can cope with disappearing nodes by routing transmission around those "holes;" (3) the mesh-network topology lends itself particularly well to distributed/scattered sensor applications, where a large number of sensors are scattered over a large area.

The drawback to mesh networks is that they tend to consume a lot of power. This is power that could be saved for applications were the user is only interested in a certain subset of the wireless mesh-network and doesn't need to interact with the majority of the mesh-network. Some applications of mesh-networks, however, require the user to find (local) minima or maxima. For example, in a sensor mesh-network with temperature sensors scattered over an area we might only be interested in finding hot spots with high temperatures but not the hottest spot with the highest temperature. Therefore, the sensors in a "cold" part of the network are probably not of interest to the application, thus the application has to follow the temperature gradient towards the high temperature areas.

What is needed is a system and method that allows the whole of the mesh-network radios (e.g. RF) to be powered off when not in use. What is also needed is a mesh-network establishment that is driven by gradients and resource or service availability. This allows a lean mesh-network to be established that saves powers and reduces costs.

SUMMARY OF THE INVENTION

Exemplary embodiments include a gradient-driven mesh-network establishment method, including switching on a plurality of nodes in a vicinity of the wireless personal area network, detecting an acknowledgment signal via a wireless personal area network signal, querying for at least one of a resource and a physical quantity, selecting a subset of the plurality of nodes and instructing the subset of the plurality of nodes to send out a low power radio transceiver DISCOVER squirt signal to a neighborhood associated with the subset of the plurality of nodes, wherein nodes exclusive of the subset of the plurality of nodes turn off in response to an expiration of a time-out period, wherein, on receipt of the DISCOVER squirt, if the plurality of nodes do not power-up then the wireless personal area network is shut down.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution which allows an entire mesh network to be powered off if it is not needed. Furthermore, mesh network establishment is driven by gradients and resource or service availability. As such a lean mesh network in contrast to a fat network can be achieved that saves power and cost.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
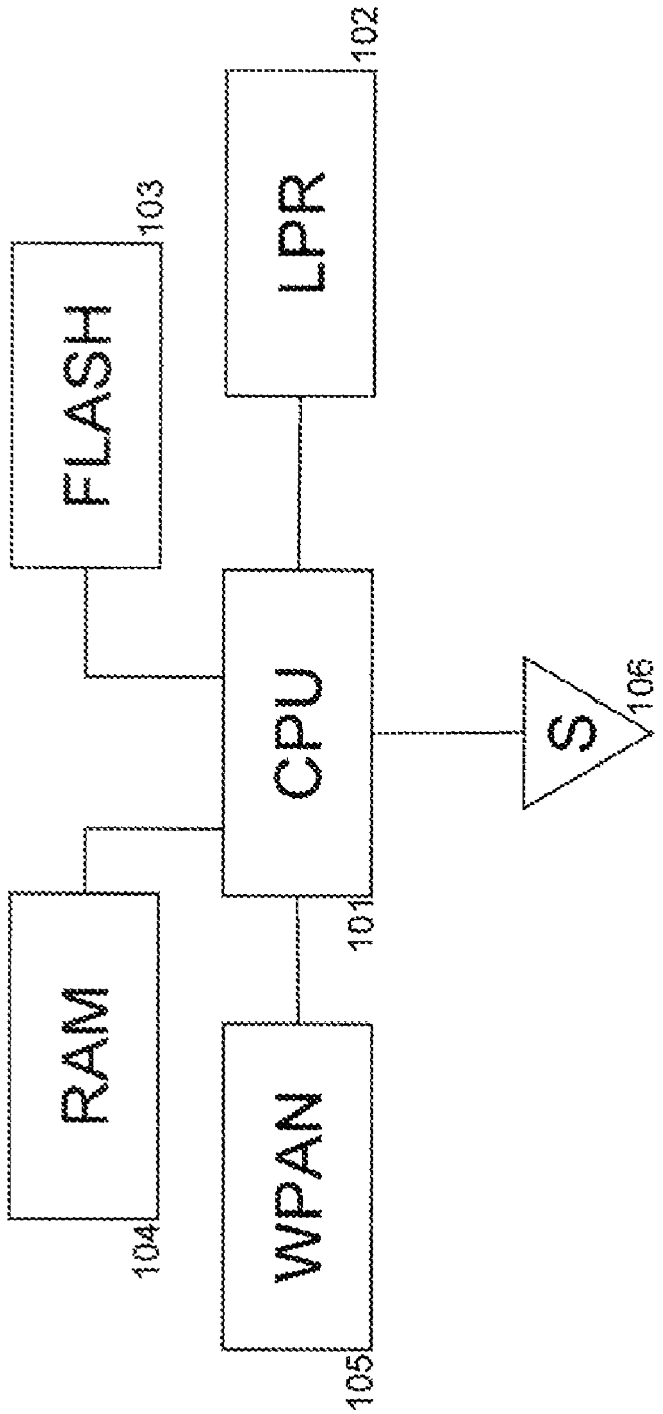
FIG. 1 illustrates an exemplary embodiment of a wireless node device in a mesh-network.

The detailed description explains the preferred embodiments of the invention, together with advantages and features, by way of example with reference to the drawings.

DETAILED DESCRIPTION OF THE INVENTION

In exemplary embodiments, the systems and methods described herein utilize a wireless personal area network (WPAN) transceiver consisting of a low power radio transceiver (LPR). It is appreciated that lower power consumption as compared to convention mesh networks is achieved. In operation, an initial WPAN node switches on sleeping nodes in its vicinity (i.e., vicinity nodes) using an LPR DISCOVER squirt signal, a short message sent via a low power radio transceiver (LPR) containing the personal area network identifier of the WPAN and the channel it uses. The WPAN node awaits the acknowledgment (ACK) signal via WPAN messages and then queries the sending WPAN nodes for the resource or physical quantity it is looking for (e.g., temperature reading from an attached sensor). Next, the WPAN repeats the process by selecting a suitable subset of the discovered vicinity nodes and asks them to in turn to send out LPR DISCOVER squirts to their neighborhood. Vicinity nodes that are not required to participate go back to sleep after a timeout period. In exemplary embodiments, for modification of the LPR DISCOVER squirt message, two additional values are defined: a query identifier and a directed threshold value. In exemplary embodiments, for modification of the behavior on receipt of an LPR DISCOVER squirt, a node does not power up the WPAN if the query identifier has already been seen in the last X rounds and if the node's own sensor threshold is below (or above respectively) the directed threshold.

In exemplary embodiments, a node that needs to access the service provided by another node (the requester node) awakes the sleeping nodes in its vicinity (1$^{st}$ generation neighbor nodes) using an ultra low power radio transceiver. The requester node then sends to these 1$^{st}$ generation neighbor nodes a message describing the service it requests and the side information needed to optimize the search. All 1$^{st}$ generation neighbor nodes process the side information according to a prescribed algorithm that determines if they should go back to sleep or remain active (1$^{st}$ generation active neighbor nodes). 1$^{st}$ generation active neighbor nodes cheek if they can provide the requested service and signal their capability (able or not able to provide service) back to the requester node. In ease one or several 1$^{st}$ generation active neighbor nodes can provide the service, the requester node selects the one to provide the service according to some algorithm. In case none of the 1$^{st}$ generation active neighbor nodes can provide the service the requester node asks the 1$^{st}$ generation active neighbor nodes to continue the search and the process described above repeats for each of the 1$^{st}$ generation active neighbor nodes: they awake the sleeping nodes in their vicinity (2$^{nd}$ generation neighbor nodes) using the ultra low power radio transceiver and send to the 2$^{nd}$ generation neighbor nodes a message describing the service requested and the side information. All 2$^{nd}$ generation neighbor nodes process the side information according to a prescribed algorithm that determines if they should go back to sleep or remain active (2$^{nd}$ generation active neighbor nodes). All 2$^{nd}$ generation active neighbor nodes check if they can provide the requested service and signal their capability (able or not able to provide service) back to the requester node using the 1$^{st}$ generation active nodes as relay. In case one or several 2$^{nd}$ generation active neighbor nodes can provide the service, the requester node selects the one to provide the service and to determine the route—the set of active nodes to relay messages—to reach it. In case none of the 2$^{nd}$ generation active neighbor nodes can provide the service the 2$^{nd}$ generation active neighbor nodes may continue the search (possibly with the assistance of direction from the 1$^{st}$ generation neighbor node). This process repeats until one node that can provide the service is found or none of the last generation neighbor nodes has been activated to pursue the search.

FIG. 1 illustrates the configuration of an exemplary node. The exemplary node consists of at least a central processing unit (CPU) 101, random access memory (RAM) 104, non-volatile memory (e.g., electrically erasable programmable read only memory or read only memory) 103, a WPAN modem 105, a LPR 102 and an attached sensor 106. The default state for each WPAN node is off. The WPAN modems 105 are initially switched off and the CPU 101 is in deep sleep mode to conserve power. However, the modem 105 and CPU 101 can be awakened over the WPAN using a LPR "squirt."

Figure 2:
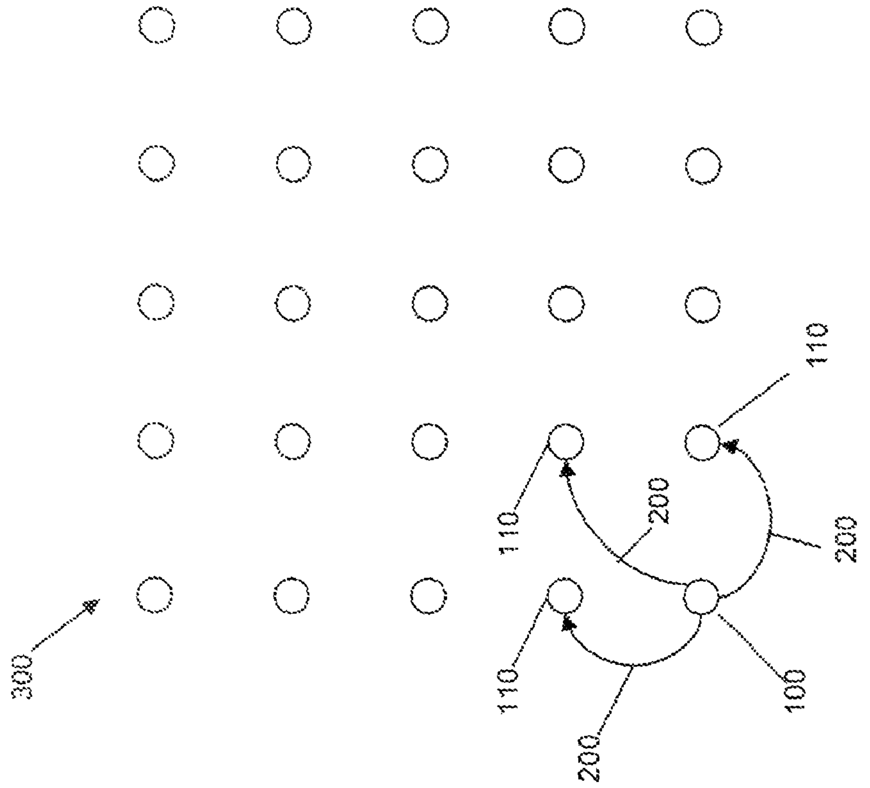
FIG. 2 illustrates an exemplary embodiment of a mesh-network structure.

FIG. 2 illustrates WPAN nodes in an exemplary configuration. For example, the WPAN node 100 has the ability to establish a mesh-network for the purpose of finding a resource or service; or for the purpose of following a gradient. To accomplish this, the WPAN node 100 issues a LPR DISCOVER data squirt 200 to its environment 300 as illustrated in FIG. 3. In response to the LPR DISCOVER data squirt 200, all nodes 110 in the vicinity of the initiating WPAN node 100 will wake up, turn on their WPAN modems 105 and "tune" to the personal area network (PAN) coordinates conveyed in the LPR DISCOVER data squirt 200. The nodes 110 can then join the PAN and report back to the initiating node 100 with an IDENT message 210 identifying themselves and also the node from which they received the LPR DISCOVER data squirt 200. The WPAN node 100 can then query each of the vicinity nodes 110 for the existence of the resource it is searching for or the value of the sensor for which it wanted to follow the gradient. Gradients can be any measurable value, temperature, humidity, traffic, flow rates, etc. Once the WPAN node 100 finds the resource or gradient it was looking for, the search is terminated and the rest of the vicinity nodes 110 may go back to a low power, deep sleep mode.

Figure 3A:
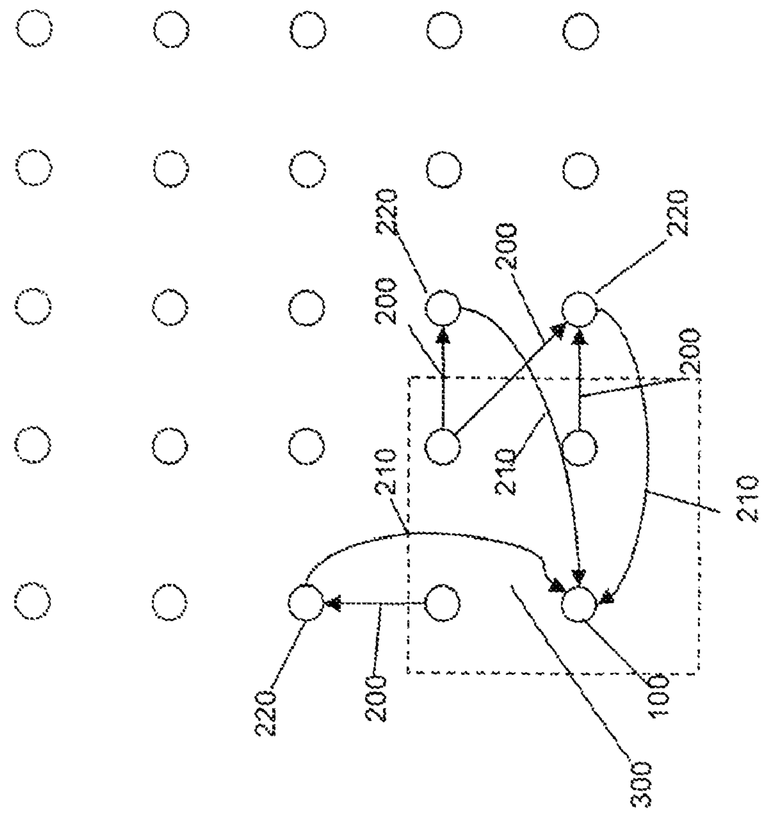
FIG. 3A illustrates an exemplary embodiment of a mesh-network structure.

It is appreciated that in some circumstances, the WPAN node 100 does not find the resource or gradient for which it was looking. The WPAN node 100 can then ask the current set of vicinity nodes 110 to issue an LPR DISCOVER data squirt 200 to wake up the nodes in their neighborhood using the same PAN coordinates as the original LPR DISCOVER data squirt 200 as illustrated in FIG. 3*a*. The WPAN node 100 may make a request by broadcasting the request to every one of the current set of vicinity nodes 110 or by asking each of the vicinity nodes one-by-one. The one-by-one approach allows the original WPAN node 100 to better control the amount of data coming back.

Figure 3C:
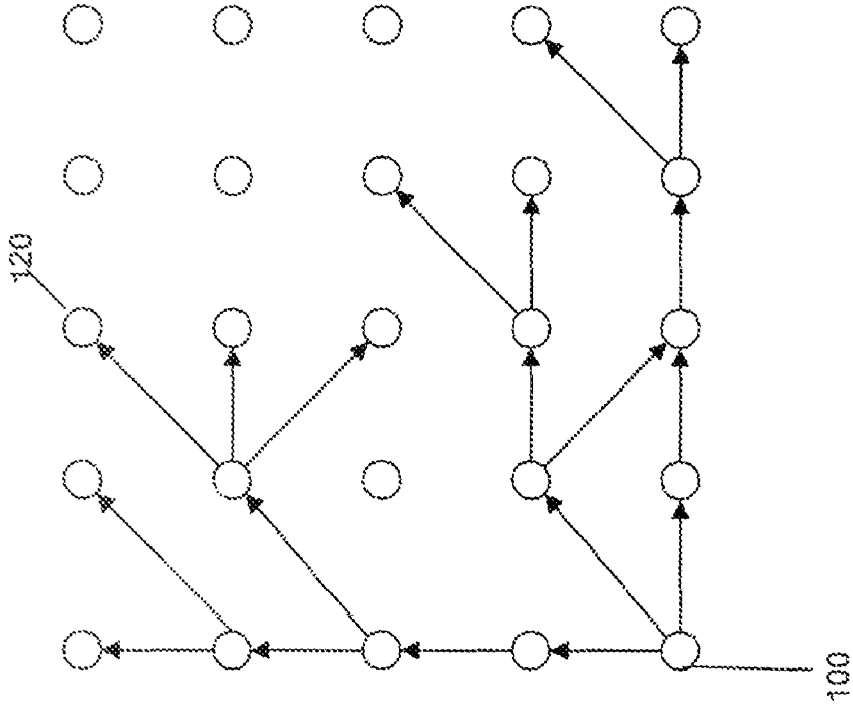
FIG. 3C illustrates an exemplary embodiment of a mesh-network structure.
Figure 3B:
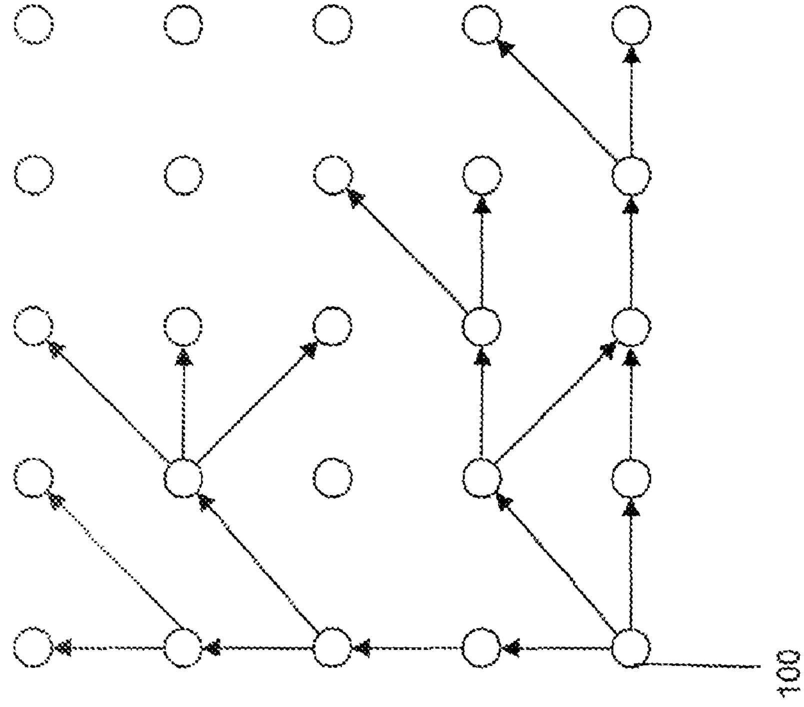
FIG. 3B illustrates an exemplary embodiment of a mesh-network structure.

Once nodes join the network in response to the LPR DISCOVER data squirt 200 they send a message 210 back to the original WPAN node 100. This message is sent back by each joining node 220, which creates a mapping tree of the real network as illustrated in FIG. 3B. Nodes that do not join go back to deep sleep. The process is repeated until the resource searched for is found; or until the gradient is followed to node 120 exhibiting the current minimum or maximum value. Nodes that do not return the resources or values of interest are turned off as illustrated in FIG. 3C.

In exemplary embodiments, the WPAN node 100 uses primary sensor information to follow a gradient and then uses secondary sensor information to pin-point a particular node. For example, temperature sensor information can be used to locate hot spots in a disaster area (temperature sensors use very little energy and are cheap to operate). Once the hot spots have been identified, each sensor node can measure gas content (gas sensors being more expensive to operate). This embodiment can be further extended to uses tertiary, etc. Still another embodiment uses sensor information (e.g., either simple, primary, secondary, tertiary, etc.) to follow a gradient and then uses an actuator on the target node 120.

In exemplary embodiments, sensor examples include temperature sensors, humidity sensors, light sensors, barometric sensors, gas sensors, Geiger counters, global positioning sensors, electrical field sensors, acceleration sensors, etc. Almost any digital sensor could be utilized. Furthermore, instead of sensor reading, "synthetic" values that are not directly derived from a sensor, but computed could also be used.

The following example (example 1) illustrates the ease where a device needs to access a service it does not support but can be provided by of another device. Workers in an oil refinery are carrying PDAs equipped with WPAN radio transceivers. The refinery site is also equipped with a network of fixed WPAN radio devices and some of these, strategically placed at the top of various infrastructures within the refinery, are equipped with sirens. Using the WPAN formed by the radio transceivers in the PDAs and the fixed infrastructure in the refinery, a worker can sound the siren closest to him to signal an emergency situation by pressing a key on his PDA. In example 1, sirens are situated at the top of structures within the oil refinery for increasing the probability that the alarm will be heard. The algorithm for determining if a node should go back to sleep or be active is based on the fact that the sirens are located at a higher altitude than any worker within the refinery. Active nodes taking part in the search for a siren will send neighbor nodes a message requesting a node with a siren and include their barometric pressure in the message. Only neighbor nodes with a barometric pressure equal or lower than the one contained in the requesting message will remain active. All the other neighbor nodes will immediately go back to sleep. This results in the search propagating from nodes to nodes that are at the same level or above. It avoids the search to unnecessarily propagate downwards, thus minimizing the number of nodes that have to be activated for locating and exercising the service. Resources and overall power consumption are minimized.

Example 2 describes the situation where a device wants to use one of its services but, because that service is not available in the state the device currently is, might try to get it from another device. Cellular phones are equipped with WPAN transceivers and can form a WPAN. When a user wants to send an SMS but is unable to connect to the cellular network because he is in a shielded area (tunnel, deep inside a building, etc.), he might reach through the WPAN a phone that can connect to the cellular network and send the SMS. The same algorithm described above can be used in example 2, based on the fact that phones situated higher in a building, site, etc. have a better chance to have access to the cellular system.

In exemplary embodiments, many algorithms for selecting active and sleeping nodes, many methods for propagating capabilities of active nodes back to the requester node, and many methods for selecting the node that will actually provide the service and the route to reach it are possible.

In exemplary embodiments, any variation of the proposed embodiments could also make use of a wireless local area network or any other wireless technology (e.g. 802.15.4 or ZigBee, etc.) instead of WPAN.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a wireless personal area network, a gradient-driven mesh-network establishment method, consisting of:

switching on a plurality of nodes in a vicinity of the wireless personal area network;

detecting an acknowledgment signal via a wireless personal area network signal;

querying for at least one of a resource and a physical quantity;

selecting a subset of the plurality of nodes; and instructing the subset of the plurality of nodes to send out a low power radio transceiver DISCOVER squirt signal to a neighborhood associated with the subset of the plurality of nodes, wherein nodes exclusive of the subset of the plurality of nodes turn off in response to an expiration of a time-out period, wherein, on receipt of the DISCOVER squirt, if the plurality of nodes do not power-up then the wireless personal area network is shut down.

2. The method as claimed in claim 1 wherein each node of the plurality of nodes consists of:

a central processing unit;

a random access memory coupled to the central processing unit;

a non-volatile memory coupled to the central processing unit;

a wireless personal area network modem coupled to the central processing unit;

a low power radio transceiver coupled to the central processing unit; and at least one sensor coupled to the central processing unit.

3. The method as claimed in claim 2 wherein each node of the plurality of nodes established a mesh-network for at least one of finding a resource and service and following a gradient.

4. The method as claimed in claim 3, wherein each node of the plurality of nodes joins the wireless personal area network and reports to an initiating node to identify each node of the plurality of nodes and to identify the node from which each node of the plurality of nodes received the LPR data squirt.

5. The method as claimed in claim 4 further consisting of terminating querying for at least one or a resource and a physical quality in response to a respective node discovering a particular at least one of a resource and physical quantity.

6. A gradient-driven mesh-network establishment system, comprising:

a plurality of nodes in a wireless personal area network, each node of the plurality of nodes comprising:

a central processing unit;

a random access memory coupled to the central processing unit;

a non-volatile memory coupled to the central processing unit;

a wireless personal area network modem coupled to the central processing unit;

a low power radio transceiver coupled to the central processing unit; and at least one sensor coupled to the central processing unit;

a process residing on the central processing unit, the process having instructions for:

switching on a plurality of nodes in a vicinity of the wireless personal area network;

detecting an acknowledgment signal via a wireless network signal;

querying for at least one of a resource and a physical quantity;

selecting a subset of the plurality of nodes;

instructing the subset of the plurality of nodes to send out a low power radio transceiver DISCOVER squirt signal to a neighborhood associated with the subset of the plurality of nodes, wherein nodes exclusive of the subset of the plurality of nodes turn off in response to an expiration of a time-out period, wherein, on receipt of the DISCOVER squirt, if the plurality of nodes do not power-up then the wireless personal area network is shut down; and terminating querying for at least one or a resource and a physical quality in response to a respective node discovering a particular at least one of resource and physical quantity, wherein each node of the plurality of nodes established a mesh-network for at least one of finding a resource and service and following a gradient, wherein each node of the plurality of nodes joins the wireless personal area network and reports to an initiating node to identify each node of the plurality of nodes and to identify the node from which each node of the plurality of nodes received the LPR data squirt.

* * * * *